UNITED STATES PATENT OFFICE.

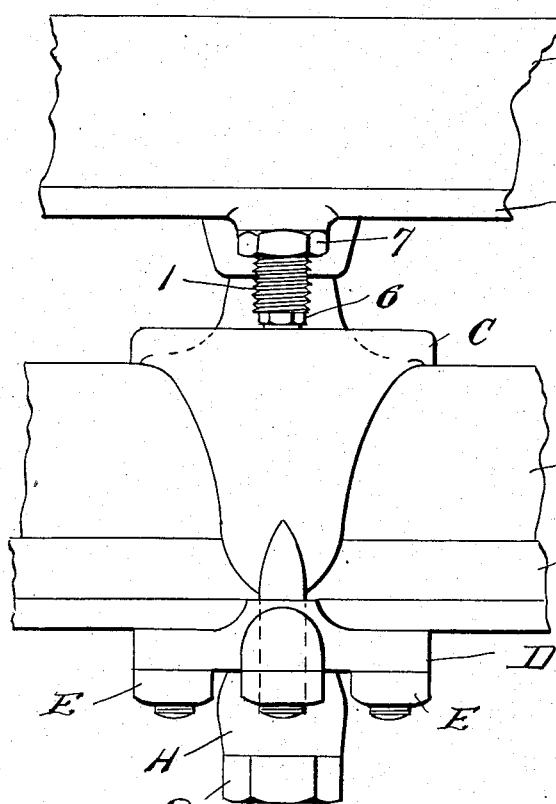
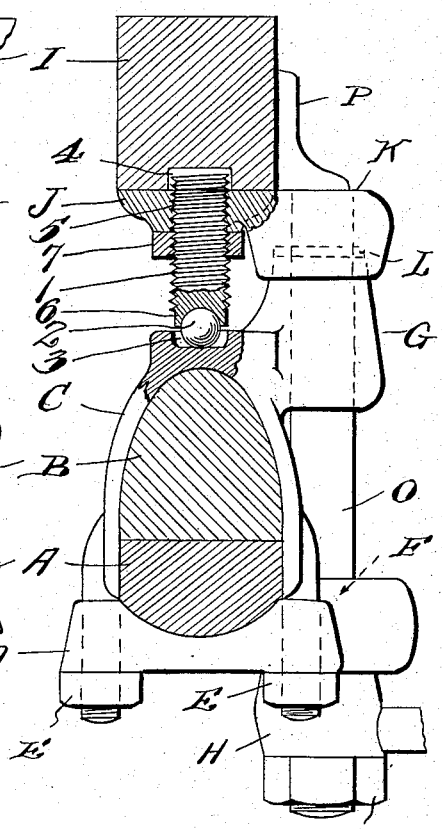
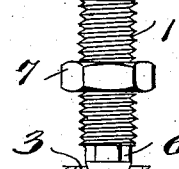
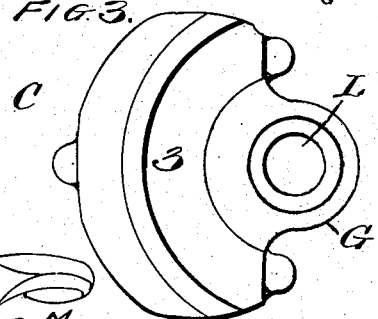
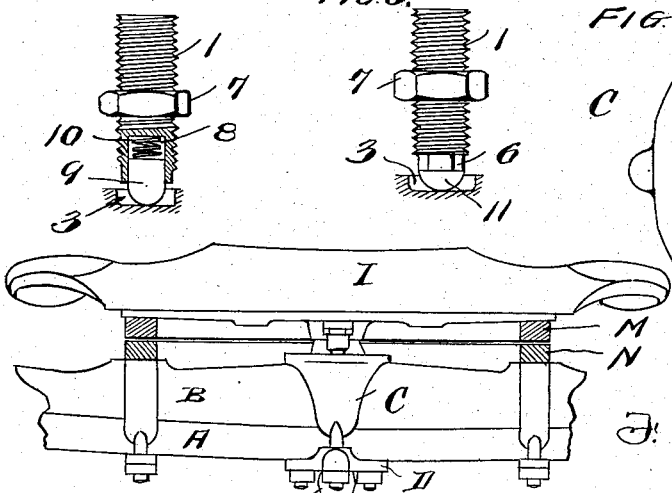
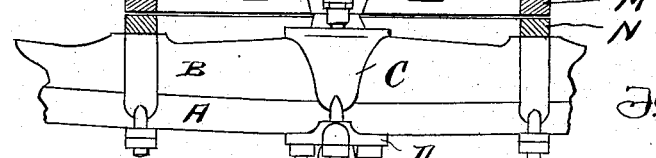

FRANK E. WILCOX, OF MECHANICSBURG, PENNSYLVANIA.

VEHICLE-GEAR.

1,171,761.   Specification of Letters Patent.   Patented Feb. 15, 1916.

Application filed June 11, 1915. Serial No. 33,469.

*To all whom it may concern:*

Be it known that I, FRANK E. WILCOX, a citizen of the United States, residing at Mechanicsburg, in the county of Cumberland and State of Pennsylvania, have invented certain new and useful Improvements in Vehicle-Gears; and I do hereby declare the following to be a full, clear, and exact description of the invention, such as will enable others skilled in the art to which it appertains to make and use the same.

The object of my invention is the provision—generally in connection with a vehicle gear including a head block plate having a perforated lug, upper and lower fifth wheel members located between the head block plate and axle or axle bed, a king bolt clip with a perforated head, and a king bolt—of means for raising the head block plate and upper member of the fifth wheel so the frictional contact of the fifth wheel members will not be excessive, and so the superimposed weight may be supported by the body of the clip directly in line with the axle, and not by the lug, said means to be so constructed that the adjustment may be made after the parts of the gear are assembled. However, part of the invention, especially the bearing in combination with other parts, may be used, exclusive of other parts.

In practice the excessive frictional contact of the fifth wheel members prevents the easy turning of one member relative to the other and consequently the fifth wheel members are subjected to excessive wear. My invention is designed to obviate this objectionable feature of operation and the wear of the members by wholly or partially supporting the weight directly upon the body of the clip.

With the above ends in view my invention consists in certain novelties of construction and combinations of parts as herein set forth and claimed.

The accompanying drawings illustrates an example of the embodiment of the invention, and two modifications, constructed and combined with the king bolt clip and head block plate according to the best modes of procedure I have so far devised for the purpose.

Figure 1 is a front view in elevation of the central part of an axle, axle bed, king bolt clip, head block and head block plate, showing my improvement applied. Fig. 2 is a vertical section in elevation of Fig. 1 taken in a plane at one side of the king bolt and showing the bearing partly in section. Fig. 3 is a top plan view of a king bolt clip showing the track for the bearing element. Fig. 4 is a front view in elevation of an entire gear showing the improvement applied, the front ends of the fifth wheel members being in section. Figs. 5 and 6 are modified forms of the bearing element.

Referring to the figures, the letter A designates the axle; B, the axle bed; C, an integral three-pronged king bolt clip; D, the axle clip yoke; E, the nuts on the threaded prongs; F, a hole in the yoke for a king bolt; G, the perforated head of the king bolt clip; H, the perforated brace head; I, the head block; J, the head block plate; K, the perforated lug of the plate; L, a recess at the under surface of the lug; M, the upper member of the fifth wheel secured to the head block plate; N, the lower member of the fifth wheel secured to the axle bed; O, the king bolt; P, the top end of the king bolt secured to the head block plate, as is usual, or in any suitable way; and Q is a nut at the lower end of the king bolt.

In the first four figures the bearing at one side of the king bolt consists of a threaded cylindrical element or support 1 having at the lower end a recess within which is loosely located a ball 2, which ball rests upon and turns along a curved track 3 at the top of the clip C so the weight of the body of the vehicle is taken directly by the axle bed and axle and not by the lug of the clip as in common practice. The head block has a recess 4 and the head block plate J a threaded perforation 5 to receive the top threaded end of the bearing element 1 so the said element may be turned and the head block plate and head block along with the upper fifth wheel member and the body above can be raised and lowered relatively to the lower fifth wheel member. To turn the element 1 a wrench is applied to the angular lower end 6 adjacent the ball. The jam nut 7 locks the bearing element so it cannot turn. It will be observed that the head G of the clip enters the recess L in the head block plate lug and serves as a pivotal guide without taking any substantial part of the weight. In other words, the parts interlock. However, the king bolt may serve as the pivotal guide without the interlocking parts.

In Fig. 5 the lower end of the bearing element is recessed at 8 and a loose steel point 9 and a helical spring 10 inserted, the spring performing the function of an anti-rattler.

In Fig. 6 the bearing element 1 has a rounded end 11 which frictionally bears against the surface of the track at the top of the clip.

Fig. 4 illustrates the fifth wheel members slightly separated, though they may be, and should be, in practice in slight frictional contact, but not sufficiently in contact to offer any substantial resistance in moving one member relative to the other in turning.

From the foregoing description taken in connection with the drawing it is clear that I have produced a bearing wherein the weight is transmitted directly to the top of the clip in line with the axle and axle bed, and also provided with adjustable means of efficient character for holding the fifth wheel members in such relative positions that they will not be subjected to wear to any great degree, as is the case in common practice.

What I claim is:

1. The combination of a head block plate, an axle, means at the side of the head block plate and axle including a king bolt constituting a pivotal center about which the axle turns, and an adjustable bearing element between the head block plate and axle at one side of the king bolt and directly above the axle.

2. The combination of a head block plate, an axle, a clip on the axle, means at the side of the head block plate and axle including a king bolt constituting a pivotal center about which the axle turns, and a bearing element between the head block plate and the axle clip at one side of the king bolt and directly above the axle.

3. The combination of a head block plate with a perforated lug, an axle clip with a perforated lug, a perforated axle yoke, a king bolt passed through the perforations in said elements, and a bearing between the front part of the head block plate and the top of the clip which bearing transmits the weight above the head block plate to the clip.

4. The combination of a head block plate with a perforated lug, an axle clip with a perforated lug, a perforated axle yoke, a king bolt passed through the perforations in said elements, and an adjustable bearing between the head block plate and the top of the clip and at one side of the clip lug which bearing transmits the weight above the head block plate to the clip.

5. The combination of a head block plate, an axle, an axle clip, fifth wheel members secured respectively to the axle and head block plate, a king bolt serving as a pivotal center about which the axle turns, and adjustable means between the head block plate and the clip and in line with the axle for transmitting the weight directly to the axle; said adjustable means serving to hold the upper fifth wheel member out of excessive frictional contact with the lower fifth wheel member.

6. The combination of a head block plate having a bearing element, an axle, an axle clip having at its top surface a track upon which said bearing element rests and about which it is adapted to travel, and means at the side of the head block plate and axle including a king bolt constituting a pivotal center about which the axle turns.

7. The combination of a head block plate with a perforated lug, an axle clip with a perforated lug, a perforated axle yoke, a king bolt passed through the perforations in said elements, and an anti-friction bearing between the head block plate and the top of the clip and directly above the axle which bearing transmits the weight above the head block plate to the clip.

In testimony whereof I affix my signature.

FRANK E. WILCOX.

Copies of this patent may be obtained for five cents each, by addressing the "Commissioner of Patents, Washington, D. C."